US008261267B2

(12) United States Patent
Iwamatsu et al.

(10) Patent No.: US 8,261,267 B2
(45) Date of Patent: Sep. 4, 2012

(54) VIRTUAL MACHINE MONITOR HAVING MAPPING DATA GENERATOR FOR MAPPING VIRTUAL PAGE OF THE VIRTUAL MEMORY TO A PHYSICAL MEMORY

(75) Inventors: Noboru Iwamatsu, Kawasaki (JP); Naoki Nishiguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 489 days.

(21) Appl. No.: 12/501,892

(22) Filed: Jul. 13, 2009

(65) Prior Publication Data

US 2010/0023941 A1 Jan. 28, 2010

(30) Foreign Application Priority Data

Jul. 28, 2008 (JP) ................. 2008-192965

(51) Int. Cl.
G06F 9/46 (2006.01)
G06F 12/08 (2006.01)
(52) U.S. Cl. ..... 718/1; 718/102; 718/104; 711/E12.061; 711/12.065
(58) Field of Classification Search .......... None
See application file for complete search history.

(56) References Cited

U.S. PATENT DOCUMENTS

| 6,381,682 B2* | 4/2002 | Noel et al. ............... 711/153 |
| 6,434,685 B1* | 8/2002 | Sexton et al. ............. 711/206 |
| 6,711,605 B2 | 3/2004 | Sekiguchi et al. |
| 6,789,156 B1* | 9/2004 | Waldspurger ............. 711/6 |
| 7,334,076 B2* | 2/2008 | Hendel et al. ............. 711/6 |
| 7,461,232 B2* | 12/2008 | Nicolai ................. 711/207 |
| 7,472,383 B2* | 12/2008 | Long et al. ............... 717/158 |
| 7,620,766 B1* | 11/2009 | Waldspurger ............. 711/6 |
| 7,941,799 B2* | 5/2011 | Easton et al. ............. 718/1 |
| 8,024,506 B1* | 9/2011 | Agesen et al. ............ 711/6 |
| 2005/0216696 A1* | 9/2005 | Kawaguchi ............... 711/206 |
| 2009/0113111 A1* | 4/2009 | Chen et al. ............... 711/6 |

FOREIGN PATENT DOCUMENTS

| JP | 2002-157133 | 5/2002 |
| JP | 2006-252554 | 9/2006 |
| JP | 2007-035066 | 2/2007 |

* cited by examiner

Primary Examiner — Meng An
Assistant Examiner — Abu Z Ghaffari
(74) Attorney, Agent, or Firm — Staas & Halsey LLP (57) ABSTRACT

A mapping data generator determines a virtual page number of a virtual page where an executable code in an object file is mapped. A virtual page manager manages a virtual page record containing the virtual page number, a first object ID corresponding to the virtual page number, and a detection flag indicative of existence of another virtual page record containing a second object ID identical with the first object ID. A machine page manager manages a machine page record containing the first object ID, and a machine page number to which the virtual page number is mapped. A sharable page detector determines whether a detection flag indicates existence of another virtual page record containing the first object ID and determines whether a machine page number has been set. A page mapper maps a set machine page number to the virtual page number of the access page.

11 Claims, 6 Drawing Sheets

| VM ID | FILE NAME | VERSION | UPDATE TIME | SIZE |
|---|---|---|---|---|
| VM1 | A | 5.1.2 | 0:53:08 17/4/2007 | 3848 bytes |
| VM1 | B | 7.0.6 | 20:02:08 10/10/2007 | 12152 bytes |
| ... | ... | ... | ... | ... |

FIG. 3

| VM ID | OBJECT ID | VP No. |
|---|---|---|
| VM1 | A-5.1.2-1 | 0x1a823 |
| VM1 | B-7.0.6-1 | 0xd09fb |
| VM1 | B-7.0.6-2 | 0xd09fc |
| VM1 | B-7.0.6-3 | 0xd09fd |
| ... | ... | ... |

FIG. 4

| OBJECT ID | VM ID | VP No. | MP No. | DETECTION FLAG |
|---|---|---|---|---|
| A-5.1.2-1 | VM1 | 0x1a823 | 0x8f48d | true |
| B-7.0.6-1 | VM1 | 0xd09fb | null | false |
| ... | ... | ... | ... | ... |
| A-5.1.2-1 | VM2 | 0x1a823 | null | true |
| B-8.0.0-1 | VM2 | 0x7c8ad | null | false |
| ... | ... | ... | ... | ... |
| A-5.1.2-1 | VMn | 0x1a823 | 0x8f48d | true |
| ... | ... | ... | ... | ... |

FIG. 5

| OBJECT ID | MP No. | REF. VM |
|---|---|---|
| A-5.1.2-1 | 0x8f48d | 2 |
| ... | ... | ... |

VIRTUAL MACHINE MONITOR HAVING MAPPING DATA GENERATOR FOR MAPPING VIRTUAL PAGE OF THE VIRTUAL MEMORY TO A PHYSICAL MEMORY

FIELD

The embodiments discussed herein are related to an apparatus for monitoring virtual machines running on a computer system.

BACKGROUND

In a virtualization technique, a plurality of virtual machines are run on a physical computer. Each virtual machine may execute an operating system (referred to as a guest OS) as if executed on independent hardware. Integrating a plurality of independent operating systems (OSs) and implementing them on one computer allows an effective use of hardware resources such as a central processing unit (CPU) and a storage.

On the other hand; the efficiency of memory use is inferior to a case where a plurality of server applications are executed on one hardware and one OS. For example, in comparing a case where two server applications of A and B are executed on one OS with a case where two independent virtual machines executes the applications A and B respectively on the one OS, each of the virtual machines has a program executable code for the OS on the memory in the latter case. Accordingly, the memory consumption of the entire of the virtual machines is increased.

Sharing the same page of the memory between virtual machines referring to identical contents may improve the efficiency of memory use in virtualization.

As a known technique to search pages, from among pages of a memory, containing identical contents and allocated to different virtual machines, there is a method in which pages for a guest OS are scanned, and pages, with an attribute of "executable" or "read-only", that is, pages accessible by a CPU and generally containing a program executable code, are indexed by hash values of the pages. The pages containing identical contents are identified by detecting pages having the same hash value in accordance with a hash table and comparing contents of detected pages to share the memory. Such method is employed by, for example, VMware (registered trade-mark) ESX Server which is virtualization software provided by VMware, Inc. (for example, see U.S. Pat. No. 6,789,156).

As another known technique, there is a method for sharing constituent modules of an OS between a plurality of OSs executed on one computer. In the method, when a microkernel of an OS is loaded, a kernel loader allocates an object code of the microkernel in a common region that may be accessed from the plurality of OSs to manage a list of object codes accessible from the plurality of OSs and set for a page table (for example, see Japanese Laid-Open Patent Publication No. 2007-35066).

In the method of searching the identical contents from the pages allocated to the virtual machines, the page contents are basically compared to each other. Thus, as the amount of the memory installed in the hardware increases or the number of the virtual machines increases, the calculation load increases.

In sharing the memory between the virtual machines in conventional methods, all pages used by a virtual machine upon running, for example, in a case of a normal page size of 4 KB per page, 262,144 pages per GB, are accessed and calculated. Thus, as the number of the virtual machines increases or the amount of used memory increases, the amount of calculation linearly increases.

In the method for sharing the constituent modules of the OSs, the sharable pages are limited to pages for the kernel module, and the setting of sharing is performed only when the OS is initialized. Thus, the memory sharing target is limited to the microkernel module of the OS initialized when the virtual machine is started, and the applicable range of sharing is very narrow.

SUMMARY

According to an aspect of the present invention, provided is a virtual machine monitor for monitoring virtual machines running on a computer system which runs a plurality of virtual machines by managing relation between a physical memory and a plurality of virtual memories. The virtual machine monitor includes a mapping data generator, a virtual page manager, a machine page manager, a sharable page detector, and a page mapper.

The mapping data generator determines a virtual page number capable of identifying a virtual page of a virtual memory where an executable code in an object file of a guest OS executed on a virtual machine is mapped.

The virtual page manager manages a virtual page record containing the virtual page number, a first object ID capable of identifying a part of the object file corresponding to the virtual page number, and a detection flag indicative of existence of another virtual page record containing a second object ID identical with the first object ID.

The machine page manager manages a machine page record containing the first object ID, and a machine page number capable of identifying a machine page of the physical memory where a virtual page identified with the virtual page number is mapped.

The sharable page detector determines, upon accessing an access page of the virtual memory, whether a detection flag of the virtual page record containing a virtual page number of the access page indicates existence of another virtual page record containing the second object ID identical with the first object ID. The sharable page detector further determines, when the detection flag indicates existence of another virtual page record containing the second object ID identical with the first object ID, whether a machine page number of the machine page record containing the second object ID has been set.

The page mapper maps a set machine page number to the virtual page number of the access page upon determining that the machine page number has been set.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A virtual machine monitor according to embodiments of the present invention enables memory sharing between a plurality of virtual machines when mapping (referred to as memory mapping) memory spaces allocated to the virtual machines into a memory space of a physical machine by allowing the virtual machines to access the same part of the memory space of the physical memory of the physical machine.

According to the embodiments of the present invention, memory sharing may be performed between a plurality of virtual machines with a small calculation load and a wide application range in a computer system running the plurality of virtual machines, which has a physical memory and a plurality of virtually multiplexed virtual memories.

A conventional OS may operate as if having a virtual memory with more memory space than a physical memory. The OS allocates an independent memory space of the virtual memory for each process, and every time a process is switched to another process, the memory space of the virtual memory is also switched. The memory space of the virtual memory stores an executable code of the OS and an executable code of the process.

Memory addresses of the memory space are divided into page units and managed by a memory management unit (MMU) by using a method called "paging". The MMU performs memory management by using a page table associating a memory page (referred to as logical page) of the virtual memory with a memory page (referred to as physical page) of the physical memory.

All of the logical pages are not always mapped onto the physical pages. The OS may effectively use the physical memory by using a method called "demand paging" that maps only a logical page to be accessed onto a physical page.

In a virtual machine, the guest OS virtually performs the same process with that of the conventional OS. To distinguish between a virtual machine and a physical machine, it is assumed that the terms a guest virtual memory, a guest logical page, a guest physical memory, and a guest physical page are employed for the virtual machine, and the terms a host virtual memory, a host logical page, a host physical memory, and a host physical page are employed for the physical machine.

Figure 1:
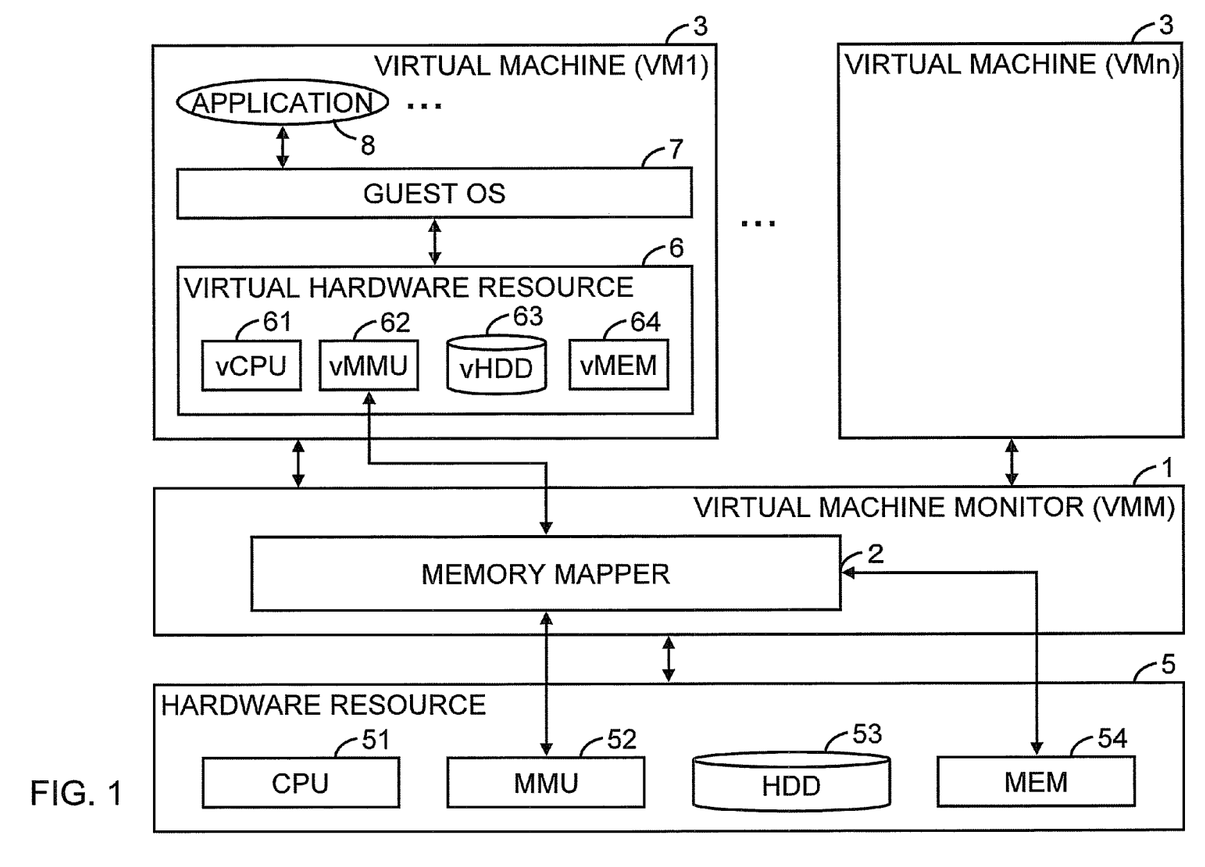
FIG. 1 is a diagram illustrating an example of a system configuration of a virtual, computer system including a virtual machine monitor according to an embodiment of the present invention.

FIG. 1 is a diagram illustrating an example of a system configuration of a virtual computer system including a virtual machine monitor according to an embodiment of the present invention.

A virtual machine monitor (VMM) 1 is configured in a computer that manages a host physical memory (denoted by "MEM" in the drawings) 54 and a plurality of virtually multiplexed guest physical memories (denoted by "vMEM" in the drawings) 64 to operate a plurality of virtual machines (identified with VM1, . . . , VMn) 3.

A hardware resource 5 of the computer includes a CPU 51, the MMU 52, an external storage device (denoted by "HDD" in the drawings) 53, and a host physical memory 54. The MMU 52 is, normally, provided in the CPU 51, The virtual machine monitor 1 divides the hardware resource 5 of the computer, and allocates divided hardware resource 5 to the plurality of virtual machines 3 to use the computer as a plurality of virtual machines 3.

The virtual machines 3 are allowed by the virtual machine monitor 1 to virtually operate as if the virtual machines were independent computers. The virtual machines 3 execute a guest OS 7 by using a virtual hardware resource 6 including a virtual CPU (denoted by "vCPU" in the drawings) 61, a virtual MMU (denoted by "vMMU" in the drawings) 62, a virtual external storage device (denoted by "vHDD" in the drawings) 63, and the guest physical memory 64 to execute application software 8.

In the virtual computer system illustrated in FIG. 1, the virtual machine monitor 1 manages the host physical memory 54 and allows the virtual machines 3 to operate as if the virtual machines 3 had a guest physical memory 64.

An access to the guest physical memory 64 by a guest OS 7 executed on a virtual machine 3 is converted into an access to the host physical memory 54 by a memory mapper 2 included in the virtual machine monitor 1.

An access to a guest logical page (referred to as a virtual page) managed by the virtual MMU 62 of the virtual machine 3 may be converted into an access to a host physical page (referred to as a machine page) managed by the MMU 52 through double conversion of memory pages performed by the virtual MMU 62 and the MMU 52. In the present embodiment, the virtual machine monitor 1 performs memory mapping from the virtual page onto the machine page with reference to a conversion table associating a page number (referred to as a virtual page number) of the virtual page with a page number (referred to as a machine page number) of the machine page.

An object file of the guest OS 7 for the virtual machine 3 is an object file in a broad sense that includes a program code such as an executable file (file with an extension of "exe"), a file of a library system (file with an extension of "dll"), or the like.

The object file includes a file header and a program header in a header part. The file header contains data indicating an architecture version, or the like. The program header contains attributes of segments obtained by dividing the object file by its offset and address data of the guest virtual memory to be mapped in execution, and the like. The object file further includes a text segment and a data segment. The text segment is directly mapped on the guest virtual memory as a program executable code in execution. The data segment is mapped on the guest virtual memory as data used by the program.

The object file is stored in the virtual external storage device 63 of the virtual machine 3. Generally, the virtual external storage device 63 is a part of a partition or a file on the physical external storage device 53 managed by the virtual machine monitor 1, and thus managed by the virtual machine monitor 1.

Operations of the virtual machine monitor 1 according to the embodiment of the present invention will be discussed.

The virtual machine monitor 1 generates mapping data for mapping a text segment that is a part (a program executable code part) of an object file into virtual pages in accordance with a header of the object file of the guest OS 7 of the virtual machine VM1 before the virtual machine VM1 is started. The virtual machine monitor 1 associates the object file with generated mapping data, and manages associated object file and mapping data.

The virtual machine 6, monitor 1 associates the object file with the virtual pages upon starting the virtual machine VM1, and manages associated object file and virtual pages.

The virtual machine monitor 1 associates, upon memory mapping, the object file with machine pages where the virtual pages are mapped onto, and manages associated object file and machine pages.

When an object file identical with that of virtual machine VM1 exists in another virtual machine VM2, the virtual machine monitor 1 searches, upon memory mapping for the text segment of the identical object file, for machine pages having identical contents and to which the text segment is mapped. By mapping virtual pages of the virtual machine VM2 onto found machine pages, the found machine pages may be shared by the virtual machine VM1 and the virtual machine VM2.

The embodiment of the present invention will be discussed in detail.

Figure 2:
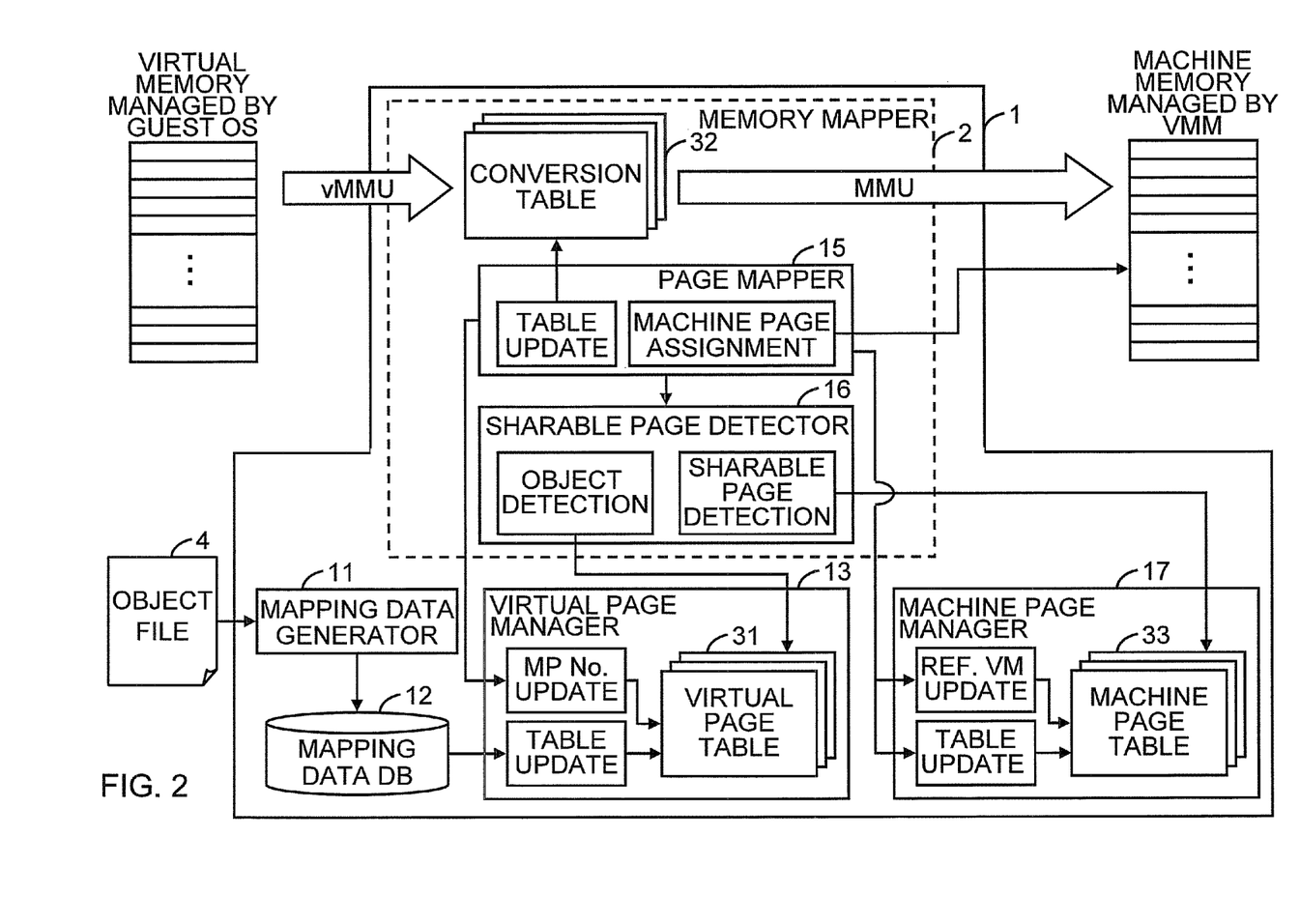
FIG. 2 is a diagram illustrating an example of a configuration of a virtual machine monitor according to can embodiment of the present invention.

FIG. 2 is a diagram illustrating an example of a configuration of a virtual machine monitor according to an embodiment of the present invention.

The virtual machine monitor 1 includes a mapping data generator 11, a mapping data database (DB) 12, a virtual page manager 13, a page mapper 15, a sharable page detector 16, and a machine page manager 17.

The mapping data generator 11 reads an object file 4 and analyzes header data of the object file 4 to register, in the mapping data DB 12, virtual page numbers of the virtual pages where the text segment of the object file 4 is mapped.

Figure 3:
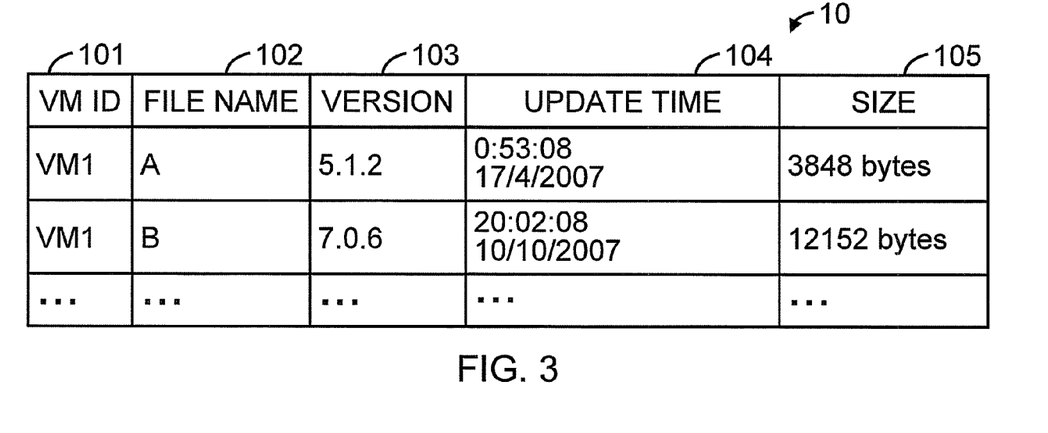
FIG. 3 is a diagram illustrating an example of data extracted from an object file of a guest OS.

FIG. 3 is a diagram illustrating an example of data extracted from an object file of a guest OS. As illustrated in FIG. 3, the mapping data generator 11 stores and manages a data list 10 containing data extracted from the object file 4 of the guest OS 7 for the virtual machine 3. The data list 10 contains fields of a virtual machine identifier (denoted by "VM ID" in the drawings) 101 capable of identifying the virtual machine 3, a file name 102 of the object file 4, a version 103 of the object file 4, update time 104 of the object file 4, and a size 105 of the object file 4.

The mapping data generator 11 generates an object identifier (ID) capable of identifying the object file 4. The object ID may be a character string formed by combining the fields in the data list 10 illustrated in FIG. 3. Alternatively, the object ID may be a hash value generated from the character string or the file contents. In the present embodiment, to simplify the discussion, a character string of "<file name>-<version>" is used as the object ID.

The mapping data generator 11 generates a mapping data record containing the virtual machine ID, the object ID, and the mapping data obtained by analyzing the header data of the object file 4, and registers generated mapping data record in the mapping data DB 12.

Figure 4:
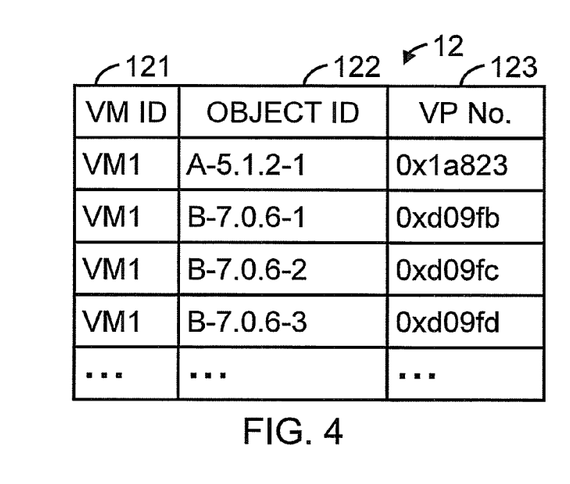
FIG. 4 is a diagram illustrating an example of data configuration of a mapping data DB according to an embodiment of the present invention.

FIG. 4 is a diagram illustrating an example of data configuration of a mapping data DB according to an embodiment of the present invention. A mapping data record of the mapping data DB 12 contains the virtual machine ID 121, the object ID 122, and a virtual page number (denoted by "VP No." in the drawings) 123, as the mapping data, capable of identifying a virtual page in which the text segment of the object file 4 is mapped. When the text segment of the object file 4 is mapped into a plurality of virtual pages, the mapping data generator 11 generates a mapping data record for each of the virtual pages.

When a change of an object file 4 of a guest OS 7 executed on a virtual machine 3 is detected, the mapping data generator 11 re-generates a mapping data record for the virtual machine 3 and updates the mapping data DB 12.

When there are a plurality of candidates for one virtual page to be mapped with the text segment of the object file 4 of the guest OS 7 for the virtual machine 3, the mapping data generator 11 generates a mapping data record for each candidate and stores generated mapping data records into the mapping data DB 12. This operation is for the case where a virtual page to be mapped with the text segment of the object file 4 may be re-allocated due to double allocation or where existence of the plurality of candidates for the virtual page is known.

The virtual page manager 13 reads the mapping data of the virtual machine 3 from the mapping data DB 12 and registers the mapping data in a virtual page table 31 upon starting the virtual machine 3 (table management process).

Figure 5:
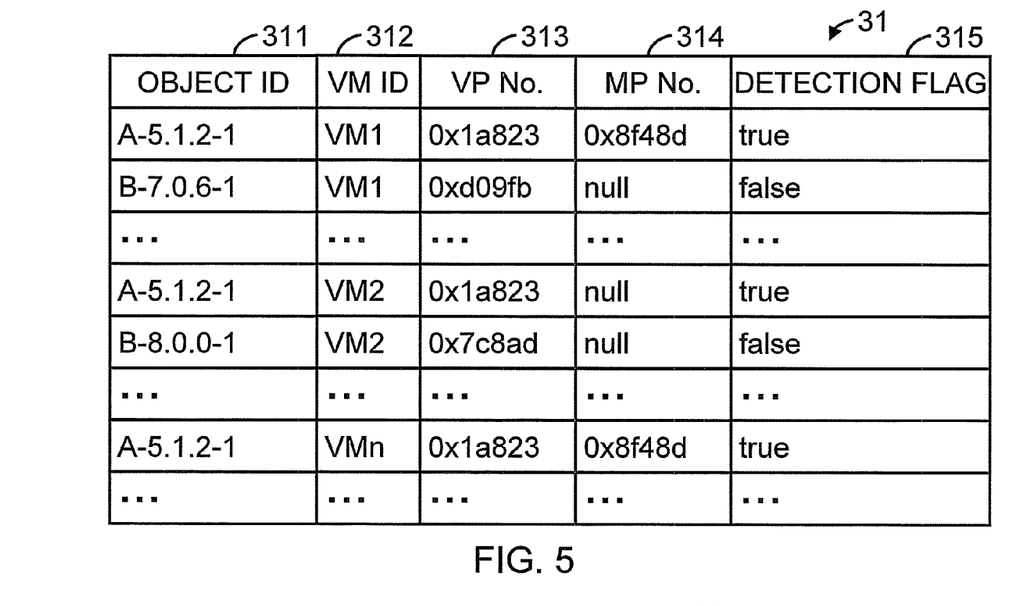
FIG. 5 is a diagram illustrating an example of a data configuration of a virtual page table according to an embodiment of the present invention.

FIG. 5 is a diagram illustrating an example of a data configuration of a virtual page table according to an embodiment of the present invention. A virtual page record of the virtual page table 31 contains an object ID 311, a virtual machine ID 312, a virtual page number 313, a machine page number (denoted by "MP No." in the drawings) 314 capable of identifying a machine page corresponding to the virtual page number 313, and a detection flag 315 capable of indicating whether an object ID identical with the object ID 311 is contained in another virtual page record.

When a virtual page record is newly added to the virtual page table 31, the virtual page manager. 13 checks whether an object ID identical with the object ID 311 contained in the newly added virtual page record is contained in any other virtual page record. If the virtual page manager 13 has detected another virtual page record containing an object ID identical with the object ID 311 contained in the newly added virtual page record, the virtual page manager 13 sets the detection flags 315 of the newly added virtual page record and a detected other virtual page record to represent "true" which indicates that another virtual page record containing an identical object ID exists.

When a machine page corresponding to a virtual page is allocated or changed, the virtual page manager 13 updates the machine page number 314 contained in a corresponding, virtual page record of the virtual page table 31 (machine page number updating process).

The page mapper 15 and the sharable page detector 16 are arranged in the memory mapper 2, or arranged for cooperation with the memory mapper 2. The memory mapper 2 performs memory mapping by using a conversion table 32.

The guest physical memory 64 of the virtual machine 3 is virtually provided by the virtual machine monitor 1. The virtual machine monitor 1 may converts a page number of a guest physical page of the guest physical memory 64 into a page number of a host physical page of the host physical memory 54 to access the host physical memory 54.

The memory mapper 2 directly converts a page number (virtual page number) of the guest logical page (virtual page) of the guest virtual memory managed by the guest OS 7 into a page number (machine page number) of the host physical page (machine page) of the host physical memory managed by the virtual machine monitor 1 with reference to the conversion table 32.

In "demand paging", a machine page corresponding to a virtual page is not always allocated but the machine page number contained in the conversion table 32 is "empty" in the initial state.

An initial access to a virtual page by the memory mapper 2 leads a page fault since the corresponding machine page number contained in the conversion table 32 is "empty". Upon detecting the page fault, the memory mapper 2 assigns a machine page for the access and updates the conversion table 32 to enable the access to an assigned machine page.

The page mapper 15 allocates a machine page in accordance with the conversion table 32 in accessing the virtual page (machine page allocation process).

The page mapper.15 instructs the virtual page manager 13 to update the machine page number 314 contained in the virtual page table 31 in response to a request to update the virtual page table 31 (table management process).

The page mapper 15 manages machine pages by copy-on-write. The page mapper 15 allocates a new machine page by copy-on-write when a write request to the machine page shared between virtual machines 3 is sent from a virtual machine 3.

The sharable page detector 16 determines whether there exists a virtual page record containing an object ID 311 corresponding to a virtual page (referred to as an access page) to be accessed with reference to the virtual page table 31 (object file determination process).

The machine page manager 17 manages a machine-page table in which the object ID is associated with the machine page number (table management process).

Figure 6:
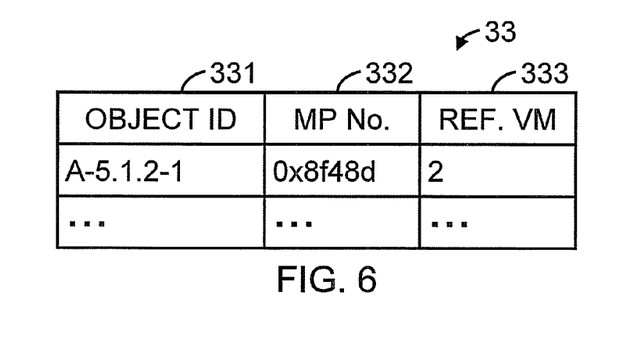
FIG. 6 is a diagram illustrating an example of a data configuration of a machine page table according to an embodiment of the present invention.

FIG. 6 is a diagram illustrating an example of a data configuration of a machine page table according to an embodiment of the present invention. As illustrated in FIG. 6, a machine page record of the machine page table 33 contains an object ID 331, a machine page number 332, and a total number (denoted by "REF. VM" in the drawings) 333 of virtual machines referring to the machine page identified with the machine page number 332.

When the number of the virtual machines sharing the machine page is changed, the machine page manager 17 updates the total number 333 of virtual machines, which is contained in the machine page record of the machine page table 33 (process for updating the total number of virtual machines).

The sharable page detector 16 determines whether there exists a sharable machine page with reference to the machine page table 33. The sharable page detector 16 instructs the page mapper 15 to change the conversion table 32 such that the same machine page on which the identical object code is mapped is referred to by the virtual machines 3 upon detecting a sharable machine page (sharable page determination process).

Figure 7:
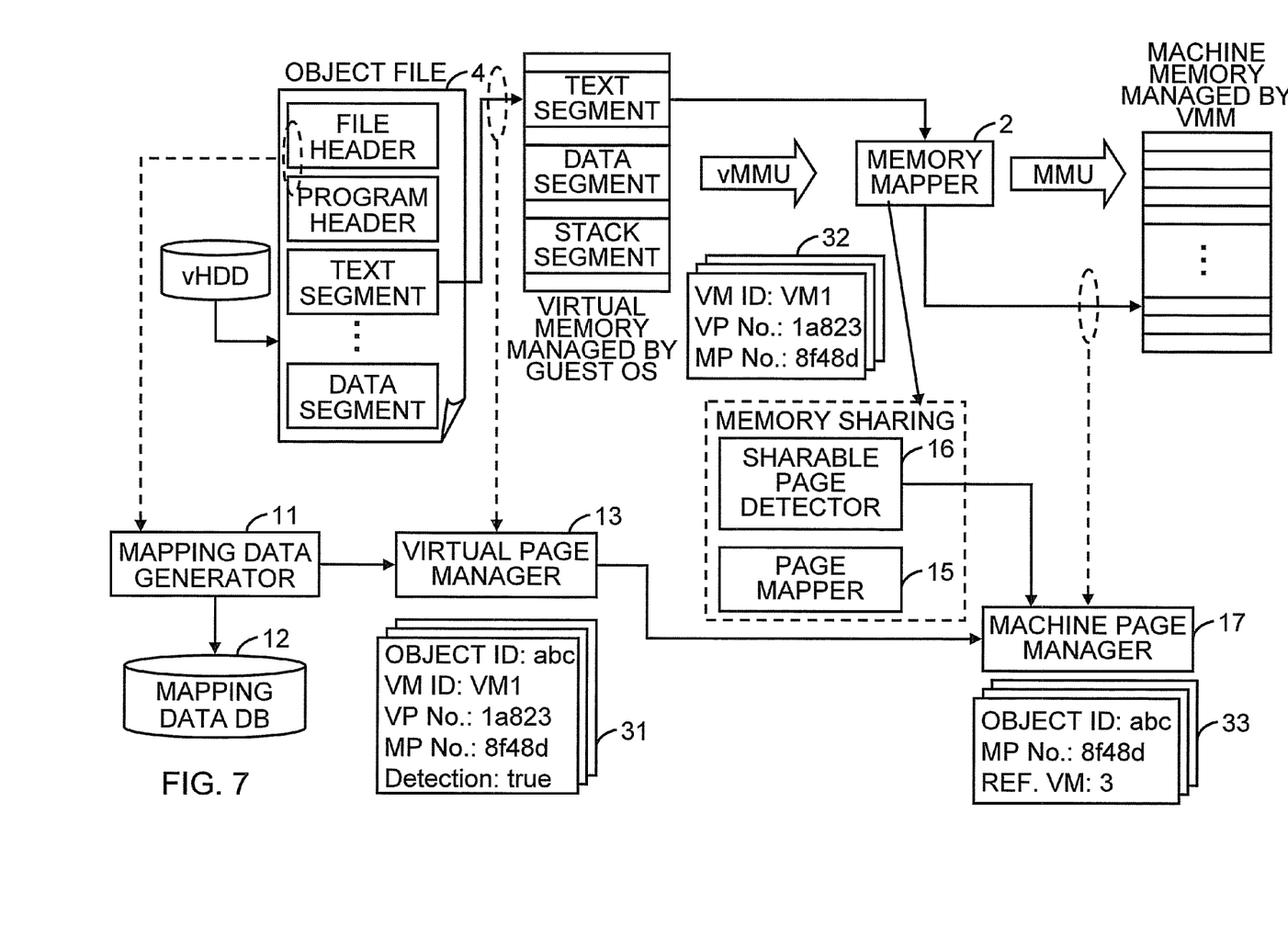
FIG. 7 is a diagram illustrating operations performed by a virtual machine monitor according to an embodiment of the present invention.

FIG. 7 is a diagram illustrating operations performed by a virtual machine monitor according to an embodiment of the present invention.

Before the virtual machine 3 is started, the mapping data generator 11 of the virtual machine monitor 1 analyzes a file header and a program header of the object file 4 stored in the virtual external storage device 63 of the virtual machine 3 and generates mapping data for mapping the text segment of the object file 4 on the virtual memory managed by the guest OS 7 to store the mapping data into the mapping data DB 12.

Upon starting the virtual machine 3, the virtual page manager 13 registers, in the virtual page table 31, associated data of the object file 4 to be executed and virtual pages mapped with the object file 4 with reference to the mapping data DB 12.

A virtual page managed by the guest OS 7 is mapped onto a machine page managed by the virtual machine monitor 1 through the virtual MMU 62, the memory mapper 2, and the MMU 52. The guest OS 7 for the virtual machine 3 may directly access a corresponding machine page managed by the virtual machine monitor 1 by accessing a virtual page.

The virtual page manager 13 manages association of the object code in the virtual page and the mapped machine page upon memory mapping. When another virtual machine 3 has an identical object file, the virtual page manager 13 determines whether there exists a machine page containing the identical mapped text segment in the host physical memory 54 managed by the virtual machine monitor 1 upon memory mapping. When a machine page containing the identical contents in the host physical memory 54 exists, the virtual page manager 13 determines that a sharable machine page is detected, and maps the virtual page onto the machine page. Thus, the page sharing between the virtual machines is implemented.

Figure 8:
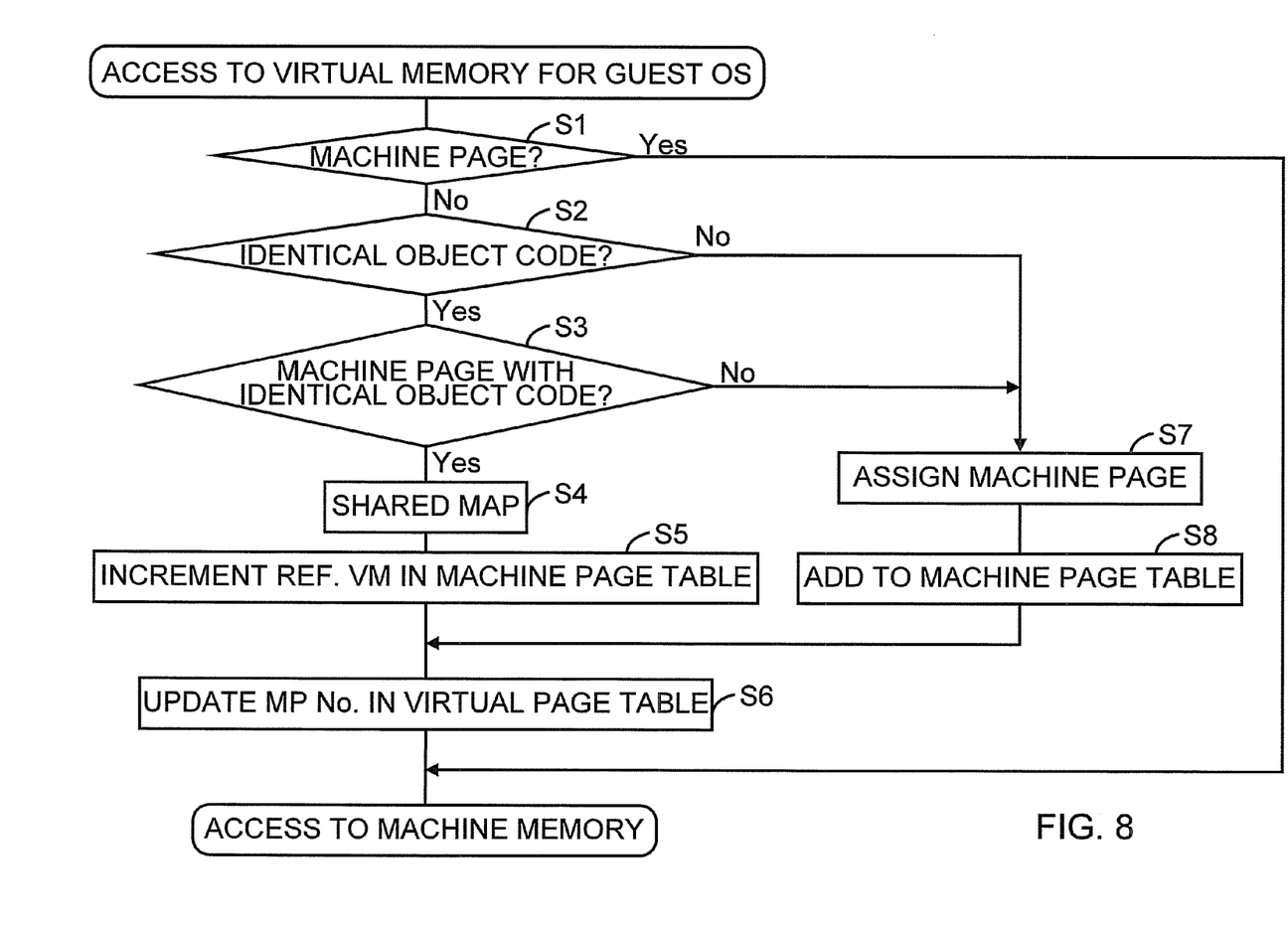
FIG. 8 is a flowchart illustrating an operation flow of a guest virtual memory accessing process performed by a virtual machine monitor according to an embodiment of the present invention.

FIG. 8 is a flowchart illustrating an operation flow of a guest virtual memory accessing process performed by a virtual machine monitor according to an embodiment of the present invention.

In operation S1, when the guest OS 7 of the virtual machine 3 accesses the guest virtual memory, the memory mapper 2 determines whether there exists a machine page managed by the virtual machine monitor 1 corresponding to an access page of the virtual machine 3 with reference to the conversion table 32. When a machine page of the virtual machine monitor 1 corresponding to the access page of the virtual machine 3 exists ("Yes" in operation S1), the process proceeds to the access to the host physical memory 54.

In operation S2, when a machine page corresponding to the access page of the virtual machine 3 does not exist, for example, the machine page has not been allocated or in a case of initial access ("No" in operation S1), the sharable page detector 16 determines Whether there exists an object code corresponding to the access page on a virtual page of another virtual machine 3 with reference to the virtual page table 31.

In operation S3, when an identical object code exists on a virtual page of another virtual machine 3 ("Yes" in operation S2), the sharable page detector 16 checks whether there exists a corresponding object code on a machine page with reference to the machine page table 33.

In operation S4, when a corresponding object code exists on a machine page ("Yes" in operation S3), the sharable page detector 16 determines that a detected machine page may be shared. The page mapper 15 updates the conversion table 32 such that the access page is converted into the detected machine page and maps (shared mapping) the access page onto the detected machine page.

In operation S5, the page mapper 15 instructs the machine page manager 17 to update the total number 333 of virtual machines referring to the machine page, which is contained in a corresponding machine page record of the machine page table 33.

In operation S6, the page mapper 15 instructs the virtual page manager 13 to update a machine page number 314 corresponding to the access page in the virtual page table 31.

In operation S7, when an object code corresponding to the access page does not exist on a virtual page of another virtual machine 3 ("No" in operation S2) or when a corresponding object code does not exist on a machine page ("No" in operation S3), the page mapper 15 assigns a new machine page.

In operation S8, the machine page manager 17 generates a new machine page record containing an object ID of the object code and a machine page number of the new machine page and registers a generated new machine page record in the machine page table 33.

Although the embodiment of the present invention has been discussed above, it is to be understood that various modifications may be made without departing from the spirit and the scope of the present invention.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such-examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. A virtual machine monitor to monitor virtual machines running on a computer system which runs a plurality of virtual machines by managing relation between a physical memory and a plurality of virtual memories, the virtual machine monitor comprising:
   a mapping data generator to determine a virtual page number capable of identifying a virtual page of a virtual memory where an executable code in an object file of a guest OS executed on a virtual machine is mapped;
   a virtual page manager to manage a virtual page record including:
      the virtual page number,
      a first object ID capable of uniquely identifying a part of the object file corresponding to the virtual page number, and
      a detection flag indicative of existence of another virtual page record containing a second object ID identical with the first object ID, and
   wherein the virtual page manager sets the detection flag without comparing the part identified by the second object ID with the part identified by the first object ID upon the computer system starting the virtual machine;
   a machine page manager to manage a machine page record including:
      the first object ID, and
      a machine page number capable of identifying a machine page of the physical memory;
   a sharable page detector to determine, upon first accessing an access page of the virtual memory, whether a detection flag of the virtual page record containing a virtual page number of the access page indicates existence of another virtual page record containing the second object ID identical with the first object ID, and determine, when the detection flag indicates existence of another virtual page record containing the second object ID identical with the first object ID, whether a machine page number of the machine page record containing the second object ID has been set; and
   a page mapper to map a set machine page number to the virtual page number of the access page upon determining that the machine page number has been set.

2. The virtual machine monitor of claim 1, wherein
   the virtual page manager generates a virtual page record for a virtual machine upon the computer system starting the virtual machine, and
   eliminates the virtual page record for the virtual machine upon the computer system stopping the virtual machine.

3. The virtual machine monitor of claim 1, wherein
   the machine page record further contains a reference number indicative of a total number of running virtual machines that access an identical machine page identified with the machine page number, and
   the machine page manager increments a reference number of a machine page record containing the set machine page number upon determining that the machine page number has been set.

4. The virtual machine monitor of claim 1, wherein, upon receiving a write command for a virtual page,
   the page mapper assigns a free machine page, and
   the virtual page manager stores a machine page number of an assigned machine page in the virtual page record.

5. The virtual machine monitor of claim 1, wherein
   the mapping data generator re-determines the virtual page number for the virtual machine upon detecting a change in the object file of the guest OS executed on the virtual machine, and
   the virtual page manager updates a corresponding virtual page record in accordance with re-determined virtual page number.

6. The virtual machine monitor of claim 1, wherein
   the mapping data generator determines a plurality of virtual page numbers corresponding to a plurality of candidate virtual pages of the virtual memory for the executable code in the object file.

7. A non-transitory computer-readable medium storing a program that causes a computer to execute a process to monitor virtual machines running on a computer system which runs a plurality of virtual machines by managing relation between a physical memory and a plurality of virtual memories, the process comprising:
   determining a virtual page number capable of identifying a virtual page of a virtual memory where an executable code in an object file of a guest OS executed on a virtual machine is mapped;
   generating a virtual page record including:
      the virtual page number,
      a first object ID capable of uniquely identifying a part of the object file corresponding to the virtual page number, and
      a detection flag indicative of existence of another virtual page record containing a second object ID identical with the first object ID, and
      wherein the computer sets the detection flag without comparing the part identified by the second object ID with the part identified by the first object ID upon the computer system starting the virtual machine;
   generating a machine page record including:
      the first object ID, and
      a machine page number capable of identifying a machine page of the physical memory where a virtual page identified with the virtual page number is mapped;
   determining, upon first accessing an access page of the virtual memory, whether a detection flag of the virtual page record containing a virtual page number of the access page indicates existence of another virtual page record containing the second object ID identical with the first object ID;
   determining, when the detection flag indicates existence of another virtual page record containing the second object ID identical with the first object ID, whether a machine page number of the machine page record containing the second object ID identical with the first object ID of the virtual page record has been set; and mapping a set machine page number to the virtual page number of the access page upon determining that the machine page number has been set.

8. A method to manage a physical memory shared between virtual machines, the method being executed by a virtual machine monitor for monitoring virtual machines running on a computer system which runs a plurality of virtual machines by managing relation between the physical memory and a plurality of virtual memories, the method comprising:

determining a virtual page number capable of identifying a virtual page of a virtual memory where an executable code in an object file of a guest OS executed on a virtual machine is mapped;

managing a virtual page record including:
the virtual page number,
a first object ID capable of uniquely identifying a part of the object file corresponding to the virtual page number, and
a detection flag indicative of existence of another virtual page record containing a second object ID identical with the first object ID, and
wherein the computer sets the detection flag without comparing the part identified by the second object ID with the part identified by the first object ID upon the computer system starting the virtual machine;

managing a machine page record including:
the first object ID, and
a machine page number capable of identifying a machine page of the physical memory where a virtual page identified with the virtual page number is mapped;

determining, upon first accessing an access page of the virtual memory, whether a detection flag of the virtual page record containing a virtual page number of the access page indicates existence of another virtual page record containing the second object ID identical with the first object ID;

determining, when the detection flag indicates existence of another virtual page record containing the second object ID identical with the first object ID, whether a machine page number of the machine page record containing the second object ID identical with the first object ID of the virtual page record has been set; and mapping, by the virtual machine monitor, a set machine page number to the virtual page number of the access page upon determining that the machine page number has been set.

9. The virtual machine monitor of claim 1, wherein the first object ID is a text segment.

10. The virtual machine monitor of claim 1, wherein, upon memory mapping, the virtual machine monitor searches for a text segment of the second object ID in the machine page record having identical contents to which the first object ID is mapped.

11. The virtual machine monitor of claim 1, wherein before the virtual machine is started, the mapping data generator analyzes a file header and a program header of the object file and generates mapping data to map the first object ID of the object file onto the virtual machine.

\* \* \* \* \*